UNITED STATES PATENT OFFICE.

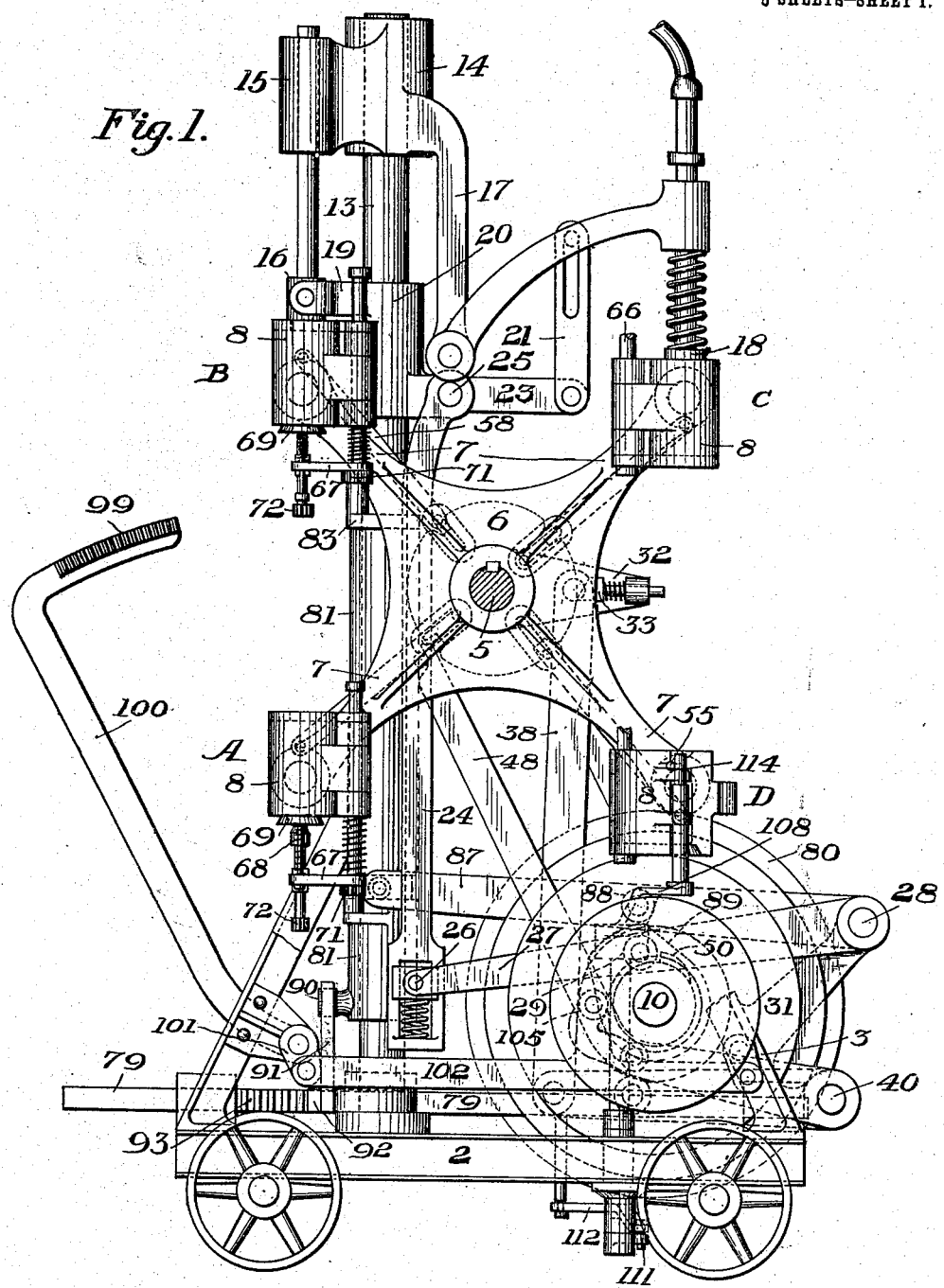

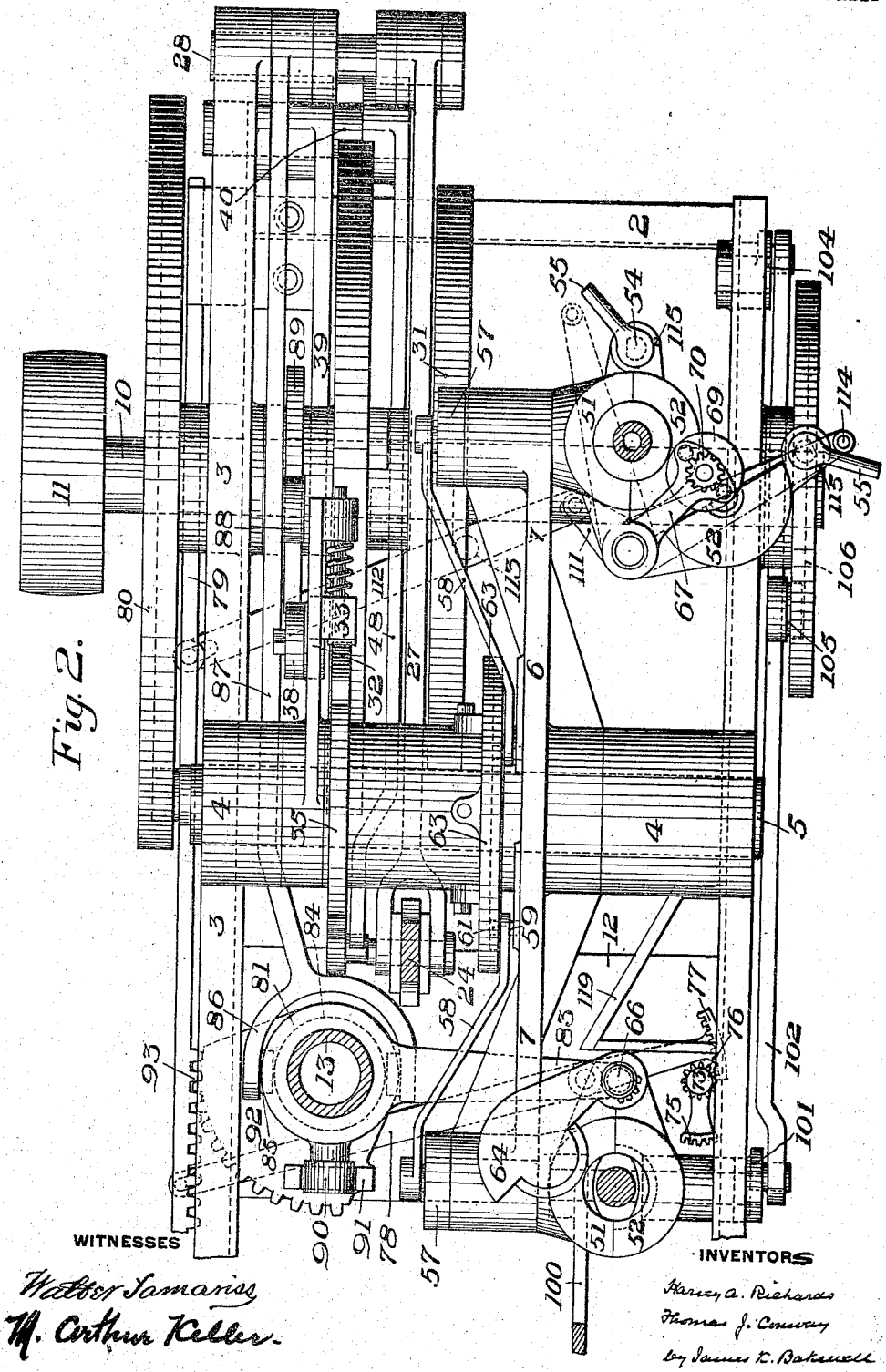

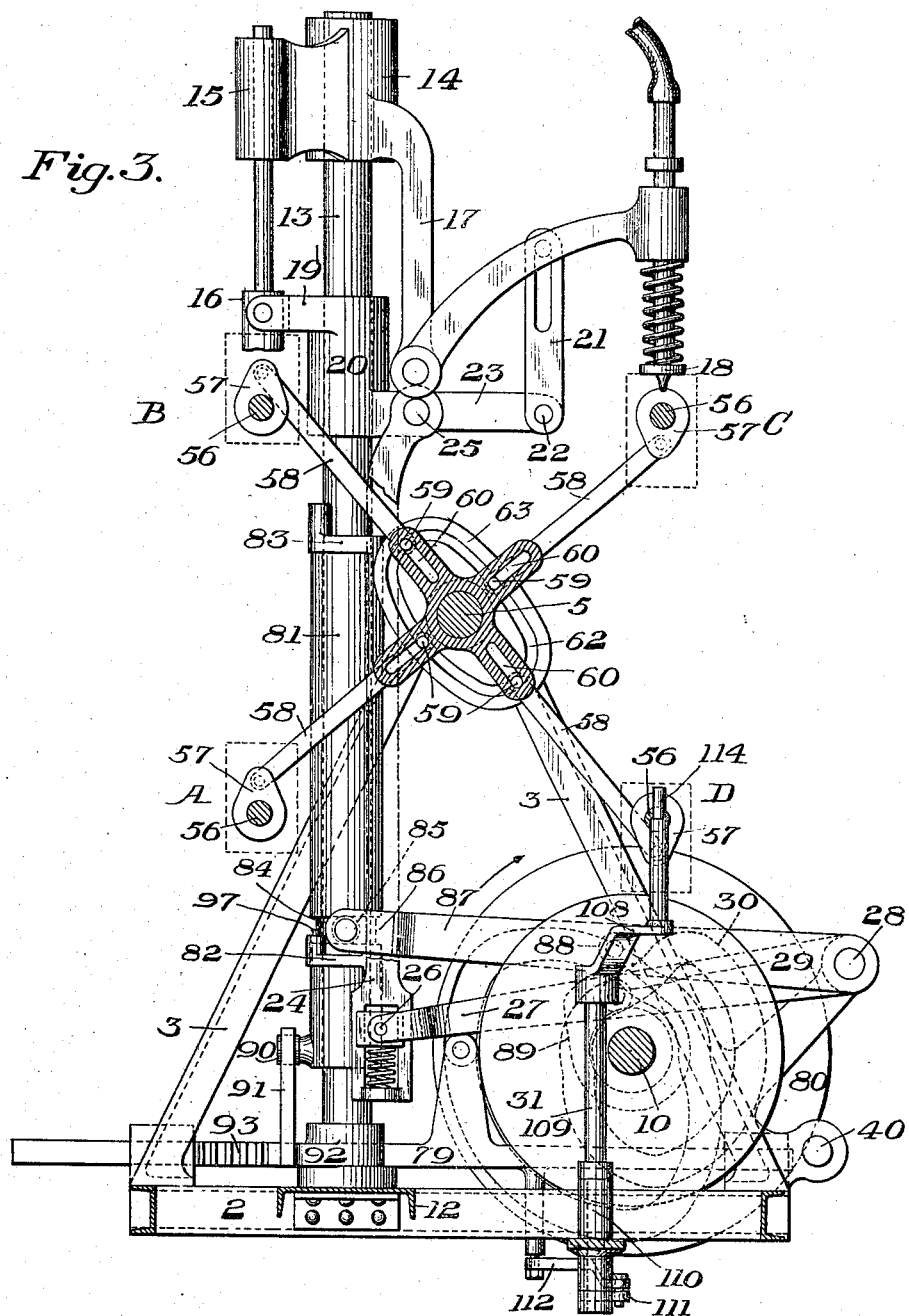

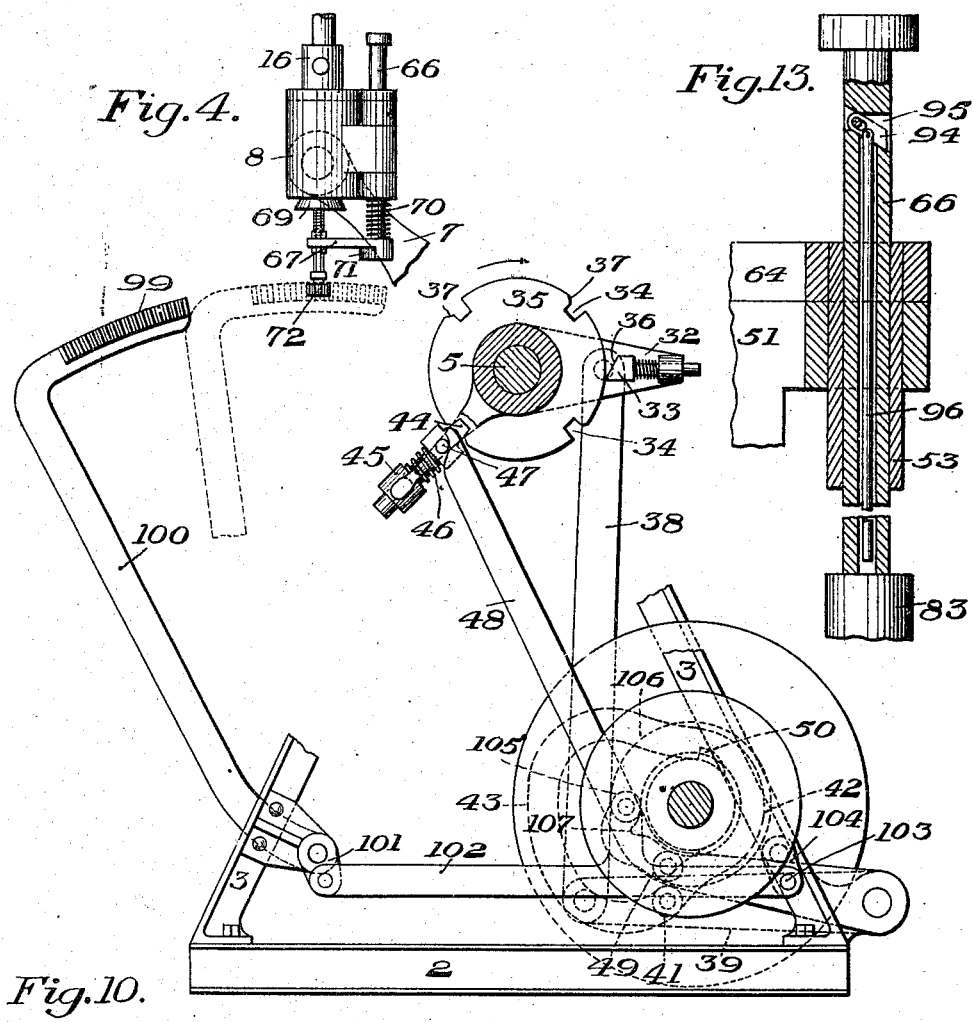
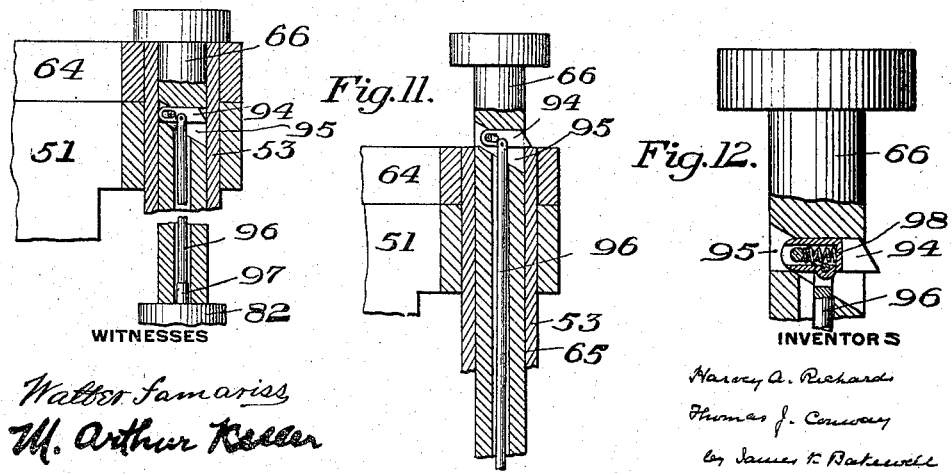

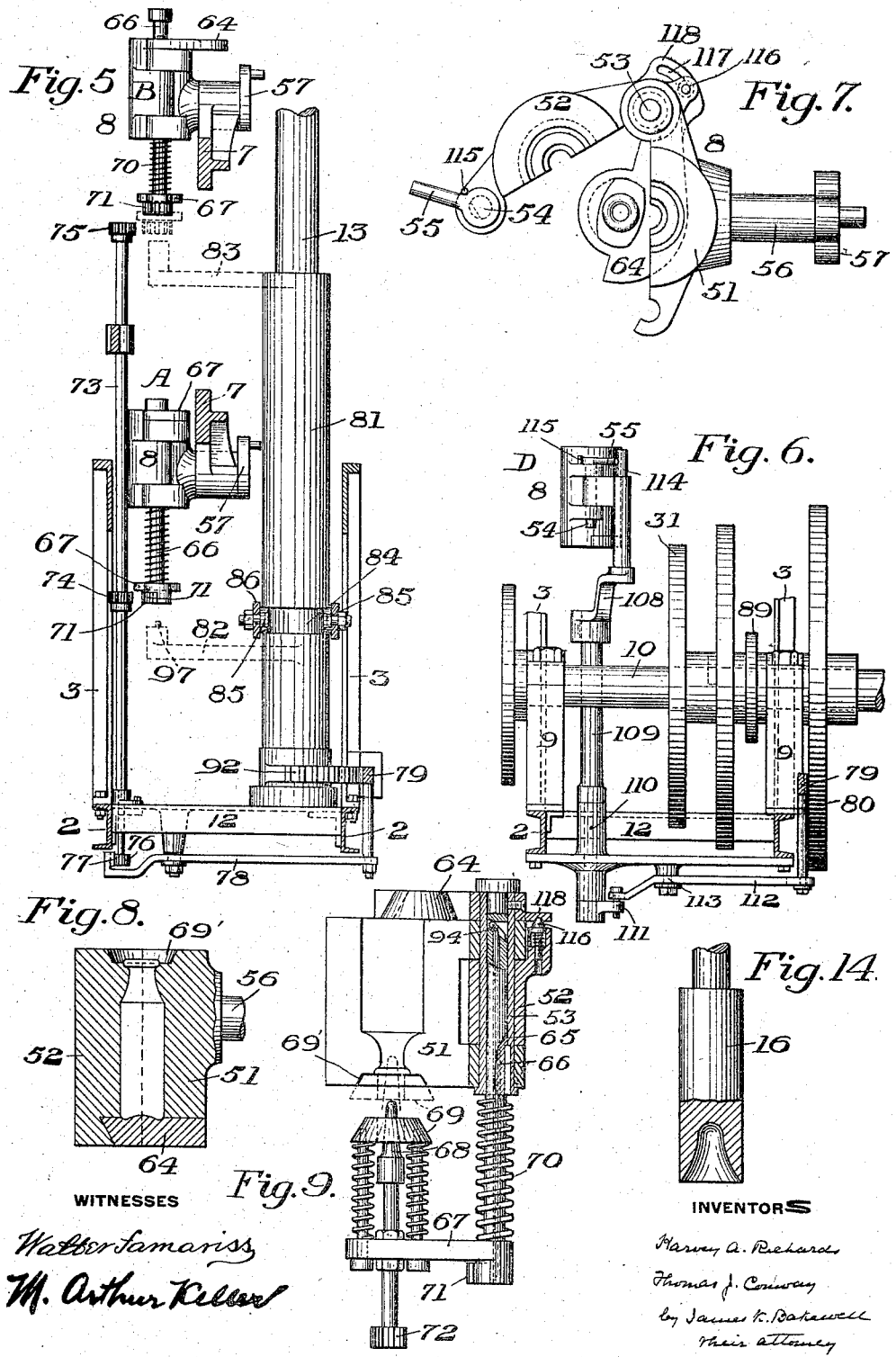

HARVEY A. RICHARDS, OF MUNCIE, INDIANA, AND THOMAS J. CONWAY, OF PITTSBURG, PENNSYLVANIA.

APPARATUS FOR FORMING HOLLOW GLASSWARE.

996,365.  Specification of Letters Patent.  Patented June 27, 1911.

Application filed September 8, 1908. Serial No. 451,956.

*To all whom it may concern:*

Be it known that we, HARVEY A. RICHARDS, of Muncie, in the county of Delaware and State of Indiana, and THOMAS J. CONWAY, of Pittsburg, in the county of Allegheny and State of Pennsylvania, have invented a certain new and useful Improvement in Apparatus for Forming Hollow Glassware, of which the following is a full, clear, and exact description, reference being had to the accompanying drawings, forming part of this specification.

This invention relates to apparatus for forming hollow glassware by a combined operation of pressing and blowing, the article being wholly formed in the same general mold; and it consists in apparatus having a mold carrier capable of being rotated in a vertical plane, and by means of which the molds are caused to be brought successively from a gathering station to pressing, blowing, and discharging stations in a manner to be hereinafter more fully set forth.

We will now describe our invention so that others skilled in the art to which it appertains may understand and construct the same, referring to the accompanying drawings in which, Figure 1 is a side elevation partly in section illustrating our improved apparatus; Fig. 2 is a plan view partly in section; Fig. 3 is a vertical sectional view, the molds being shown in dotted lines; Fig. 4 is a fragmentary sectional view illustrating mechanism for rotating the mold support; Fig. 5 is a vertical sectional view taken transversely of the mold support, and showing the mechanism for swinging the neck plunger and mold bottom into operative position; Fig. 6 is a sectional view illustrating the cam mechanism, also means for opening the mold at the discharging station; Fig. 7 is a plan view of the mold shown in open position; Fig. 8 is a vertical sectional view of the mold; Fig. 9 is a transverse sectional view of the same; Figs. 10, 11, 12, and 13 are detailed views showing means for holding the neck plunger carried by the molds in operative position while the mold is caused to be shifted from the gathering station to the pressing station; and Fig. 14 is a fragmentary sectional view illustrating the pressing plunger.

In describing our invention the reference numeral 2 indicates the base upon which the mechanism is mounted. Extending upwardly from the base 2 are the substantially A-shaped members 3. Secured at the apex of the members 3 are the bearings 4 in which is mounted the horizontal shaft 5. Keyed to the shaft 5 is the rotary mold carrier 6 provided with the radial arms 7 carrying the molds 8. Mounted in the bearings 9 is the horizontal operating shaft 10 provided with the pulley 11 which may be connected with any suitable source of power. Secured to the cross-beam 12 of the base 2 is the upright post 13, the top of which is provided with a fixed head 14 having a laterally projecting portion 15 in which is mounted the pressing plunger 16, and the depending arm 17 to which is pivotally connected the blow-head 18 which may be of any ordinary construction. The pressing plunger 16 is operatively connected by means of the forked arm 19 to a vertically movable head 20 which loosely surrounds the vertical post 13. The blow-head 18 is also operatively connected to the head 20 through the intermediary of the slotted link 21 which is pivotally connected at 22 to the laterally extending arm 23 carried by the movable head 20. Vertical reciprocating movement is imparted to the head 20 through the medium of the pitman 24 which is pivoted at 25 to the head 20, and at 26 to the cam-operated lever 27. This cam-lever 27 is pivotally connected at 28 to the frame of the machine and is provided with a roller 29 which is adapted to travel in the irregular shaped cam-slot 30 of the disk 31 keyed to the horizontal operating shaft 10.

Intermittent rotatory movement is imparted to the mold-support 6 by means of the oscillating actuating arm 32 carrying the spring-dog 33 which is adapted to engage with the notches 34 formed on the periphery of the circular disk 35 carried by the shaft 5. The spring-dog 33 is provided with an inclined face 36, and the notches 34 with a similarly inclined face 37, the purpose of which is to permit the spring-dog 32 to ride out of the notch 34 on the return stroke of the oscillating arm 32 after having moved to rotate the disk 35 in the direction indicated by the arrow in Fig. 4. The arm 32 is connected by means of the link 38 to the lever-arm 39 which is pivotally mounted on the bearing 40. This lever 39 is provided with the cam roller 41 adapted to travel in the cam-slot 42, the off-set 43 of the said cam-slot serving to rock the lever-arm 39 transmitting a similar motion to the arm 32 through the medium of the link 38. The numeral 44 indicates the locking bolt adapted to intermittently hold the rotatory mold-support in a stationary position. This bolt 44 is slidingly mounted in the fixed arm 45 and is held normally in engagement with a notch 34 by means of the coiled spring 46. In order to release the bolt 44 from engagement with the notch 34 so as to enable the mold support to be rotated, the bolt is provided with the projecting stud 47 which is adapted to be engaged by the trip arm 48 pivoted at 40 to the frame of the machine. The trip arm 48 is provided with the cam roll 49 which when struck by the cam projection 50, causes the trip arm 48 to be momentarily depressed, throwing the locking bolt 44 out of engagement with the notch 34 simultaneously with the engagement of the spring dog 33 carried by the oscillating arm 32, with a similar diametrically oppositely disposed notch 34.

The molds 8 which are preferably four in number are of the vertically divided type made in two sections 51 and 52 which are hinged together by means of the pintle 53 and locked by means of the bolt 54 which has the laterally extending handle 55. Each mold is journaled on the arm 7 of the support 6 by means of the trunnion 56 carried by the mold section 51. Secured to the end of the trunnion 56 is the crank 57 which is pivotally connected to the link 58 provided with the roller 59 adapted to travel in the radial guide-slot 60 formed in the rear face of the support 6, and a roller 61 which is adapted to travel in the substantially elliptically shaped cam-slot 62 formed in the face of the fixed disk 63. The purpose of this cam-slot 62 is to impart a reciprocating or radial movement to the links 58 which in turn cause a shifting of the cranks 57 in such a manner as to maintain the molds in a substantially vertical position when being elevated from the gathering station A to the pressing station B and when being lowered from the blowing station C to the discharging station D, also to effect a turning or inverting of the molds in their passage from the discharging station to the gathering station and a reverse movement thereto in their passage from the pressing station to the blowing station. The reference numeral 64 represents the mold bottom which is rigidly secured to the hinge pintle 53. This pintle 53 is provided with the central bore 65 and mounted therein and splined to the pintle 53 is the vertically movable post 66. Secured to the vertical post 66 is the head 67 carrying the neck plunger 68 and presser plate 69. Interposed between the head 67 and the top face of the hinge pintle is the coiled spring 70. Formed on the head 67 concentric with the posts 66 is the segmental gear 71, and carried by the stem of the neck plunger 68 is the pinion 72. Mounted in suitable bearings on the frame of the machine is the vertical shaft 73 to which is secured the lower segmental gear 74 and the upper segmental gear 75 which are adapted to mesh with the segment 71 carried by the head 67 when the shaft 73 is caused to be rotated. An oscillating movement is imparted to the said shaft 73 by means of the pinion 76 carried on the lower end of said shaft and which engages with the segmental rack 77 carried by the double armed lever 78. This lever 78 is operatively connected to the slide member 79 to which a reciprocating movement is imparted by means of the cam 80. The purpose of the oscillating shaft 73 is to impart a rotatory movement by means of the segmental gears 71 and 74 to the vertical post 66 carried by the mold when the said mold has been brought to station A. This rotatory movement imparted to the post 66 causes a lateral shifting of the head 67 carrying the neck plunger 68 and spring plate 69 into operative position with relation to the cavity of the mold (as shown in Fig. 9). The mold bottom 64 is secured to the pintle 53 at an angle to the head 67, consequently when the head 67 is shifted into position under the mold, the bottom 64 will be caused to be swung outward laterally from the mold causing the uncovering of the mold cavity which, with the mold in this inverted position provides a large mouth the full width of the article to be formed below the neck portion, and which enables the gatherer to easily introduce and accurately measure the glass before cutting it off. After the mold has been brought to station B and the article pressed a reverse movement of the vertical shaft 73 to that which caused the shifting of the head at station A causes the head 67 through the medium of the segments 75 and 71 to be swung to one side, horizontally shifting the bottom 64 into position directly over the mold preparatory to the blowing operation at station C.

Loosely carried by the vertical post 16 is the sleeve member 81 provided with the laterally extending arms 82 and 83. This sleeve 81 is provided with an annular recess 84 into which are fitted the rollers 85 carried by the bifurcated end 86 of the lever arm 87 which is pivotally mounted in the bearing 28 and is provided with the roller 88 adapted to ride upon the cam 89 by means of which the arm 87 is caused to be rocked imparting a reciprocating movement to the sleeve member 81. Secured to the side of the sleeve 81 at the base thereof is the roller 90 which engages with the vertically slotted post 91 extending upwardly from the segmental gear 92 loosely journaled at the base of the vertical post 13. This segmental gear 92 is adapted to mesh with the rack 93 carried by the reciprocating slide 79. The reciprocating slide 79 operatively connected in the above manner to the segmental gear 92 serves to impart through the medium of the slotted post 91 an oscillating movement to the sleeve 81.

The arms 82 and 83 carried by the sleeve member 81 are adapted to operate the neck plunger 68 in the following manner: When the molds are brought to stations A and B the oscillation of the sleeve 81 causes the arms 82 and 83 to be swung intermittently into position directly underneath the vertical post 64 carried by the said molds. With the arms 82 and 83 in the position stated a vertical upward movement is imparted to the sleeve 81 by means of the cam-operated lever 87 causing the arm 82 to engage with the lower end of the post 66 of the mold at station A, forcing the said post 66 and the head 67 upwardly against the pressure of the coil spring 70 until the presser plate 69 with the neck plunger 68 partially projecting therethrough has been seated within the counter-sunk cavity 69' formed in the top face of the mold (as shown in Fig. 1 and by the dotted lines in Fig. 9). The presser plate 69 is held in engagement with the recess 69' as the mold is being elevated from station A to station B, by means of the spring latch 94, shown in Fig. 12. This latch is pivoted in the recess 95 formed in the upper end of the post 66, and is operated by the depending rod 96 which is adapted to be forced upwardly by the stud 97 carried on the top of the arm 82. As the arm 82 is caused to be forced upwardly against the lower end of the post 66 the stud 97 engages with the lower end of the depending rod 96 forcing the latch 94 into a horizontal position (as shown in Fig. 10) against the pressure of the spring 98. With the continued upward movement of the post 66 the latch rides in this position against the inner wall of the pintle 53 until it emerges from the top of the bore 65 where it snaps into engagement with the top of the mold in the manner shown in Fig. 11. With the mold at the pressing station B the upward movement of the arm 83 causes the neck plunger 68 to be forced upwardly into the neck cavity of the mold against the pressure of the cushion presser plate 69 which movement is simultaneous with the downward movement of the pressing plunger 16. This downward stroke of the plunger 16 and the upward movement of the neck plunger 68 serve to form the top portion or neck of the glass article within the mold. This farther upward movement of the post 66 at the pressing station B serves to release the spring latch 94 from its engagement with the top of the mold causing it to snap back into the position shown in Fig. 13, by the gravity of the rod 96. As the latch 94 is released, the head 67 by means of the coil spring 70 is forced downwardly into the position shown in Fig. 9 and by the dotted lines in Fig. 5 upon the downward movement of the arm 83 in which position it is caused to be swung horizontally to one side in the manner explained above. Before, however, the head 67 carrying the neck plunger 68, drops into the position shown in Fig. 5 the neck plunger 68 is caused to be rotated within the mold. The purpose of this rotation is to impart a finish or polish to the mouth of the article and to prevent the molten glass from adhering to the neck-plunger as the said plunger is caused to be withdrawn. This rotatory movement of the neck plunger is accomplished by means of the segmental rack 99 which is adapted to engage with and rotate the pinion 72 carried by the stem of the neck plunger 68. This rack 99 is carried by the pivoted arm 100 which is operatively connected by means of the crank 101 to the sliding link 102 which is journaled at 103 to the swinging arm 104, and is provided with a cam roller 105 which enters the cam slot 106 provided with the off-set 107 which offset is adapted to impart to the link 102, by means of the said fixed roller 105, a reciprocating movement which in turn causes the arm 100, through the medium of the crank 101, to move back and forth in the manner shown in Fig. 4, causing the segmental rack 99 to sweep across the pinion 72.

As the molds reach the discharging station D they are automatically opened by means of the crank arm 108 which is secured to the top of the vertical shaft 109 mounted in the bearing 110 at the base of the machine. This shaft 109 is rocked or oscillated by means of the lower crank 111 which is operatively connected to the reciprocating slide 79 by the double arm lever 112 fulcrumed at 113. Extending upwardly from the crank arm 108 is the vertical finger 114, its purpose being to engage with the laterally projecting locking bolt handle 55 and to shift it to unlocking position against the stop 115 swinging open the mold section 52 as the crank arm 108 is caused to be shifted from the dotted to the full line position shown in Fig. 1. Carried by the lower hinge lug of the mold section 52 is the spring pin 116 which is adapted to travel in the recess 117 formed concentric with the hinged pintle 53 in the laterally projecting face 118 of the mold bottom 64. When the mold section 52 is being swung outwardly in the manner above described and the spring pin 116 has reached the limit of its travel within the recess 117 the mold bottom 64 will be caused to be shifted horizontally to a position approximately midway between the two mold sections 51 and 52. The purpose of this shifting of the mold bottom is to free the finished article from the cavity of the mold section 51, the article being carried forward on the mold bottom to position midway between the mold section as shown in Fig. 7 where it may be readily removed. The mold, by the means hereinbefore described, is caused to be inverted when passing from the discharging station B to the gathering station A. When the said mold in its travel has reached a position midway between the said stations it is caused to assume a horizontal position, the section 52 which has taken the uppermost position closing downwardly by gravity against the section 51 to which it is locked by means of the bolt handle 55 sweeping across the inclined face 119 (see Fig. 2) as it passes to the gathering station A.

From the foregoing description, the operation of the various parts of the machine will be readily understood. As hereinbefore stated the molds are preferably four in number and are journaled to the arms of the mold support 6 intermittently rotatable in a vertical plane. Each movement of the support serves to shift the molds one-fourth of a revolution bringing them successively from the gathering station to the pressing, blowing, and discharging stations. As the mold passes into position at station A the head 67 is caused to be swung into position underneath the mold by means of the segmental arm 74 engaging with the segment 71. As soon as the head has been shifted into position the upward movement of the arm 82 serves to force the presser plate 69 and neck plunger 68 upwardly into the position shown in Fig. 1 and by the dotted lines in Fig. 9. The glass is then gathered on the pontil rod and carried over to the machine where it is dropped into the mold cavity which has previously been uncovered by reason of the bottom 64 having been shifted horizontally to one side in the manner already described. After the glass has been dropped into the mold, a one-fourth revolution of the mold support 6 causes the mold to be elevated from station A to station B. With the mold in position at station B the neck of the article is pressed by a downward stroke of the pressing plunger 16 simultaneously with an upward stroke of the neck plunger 68. At the completion of the pressing operation the upward movement of the head 20 causes the plunger 16 to be withdrawn from the mold at the same time the lateral shifting of the arm 83 from beneath the head 67 causes the said head 67, carrying the neck plunger 68 to be forced downward by reason of the coil spring 70 to the position shown in Fig. 9 and in which position, it is caused to be shifted to one side by means of the segmental arm 75 engaging with the segment 71. The shifting of the head 67 from beneath the mold causes the swinging of the mold bottom 64 into operative position with relation to the cavity of the mold preparatory to the blowing operation at station C. A further rotation of the support 6 causes the mold to be shifted another one-fourth of a revolution to the blowing station C. As it passes from station B to station C a radial movement imparted to the link 58, by means of the elliptical cam slot 62, causes a one-half revolution of the mold crank 57 which in turn operates to right the mold, bringing the pressed neck or top portion of the article to be blown into position immediately under the blow-head 18 as shown in Figs. 1 and 3. With the mold in the above mentioned position the blow head 18 is thrown into operative connection with the mold by means of the downward movement of the slotted link 21 carried by the head 20. When the article has been finished by the blowing operation, a further one-fourth rotation of the mold support 6 causes the mold to be lowered from the station C to the station D, where the mold is opened by the swinging crank arm 108 and the article removed. A further movement of the support 6 causes the mold to be automatically closed and locked as it passes to station A. The mechanism for bringing about the proper consectivity of operation of the different parts of the apparatus has been described. The discharge of the finished article at station D is simultaneously with the charging of the mold at station A, the pressing of a portion of another article in another mold at station B and the finishing or blowing of another article in a mold at station C.

It will be apparent to those skilled in the art that many changes may be made in the construction of the different mechanisms without departing from the spirit of our invention.

Our improved glass machine will be found particularly advantageous in that it permits of a greater number of machines being employed around the glass furnace than is possible with the ordinary horizontal type of machine. Other advantages of our invention will be readily appreciated by those skilled in the art, such as, for instance, the simplicity of the different mechanisms and lightness of construction.

Having thus described our invention, what we desire to claim and secure by Letters Patent is—

1. In a machine for forming articles of glassware, charging, pressing, blowing, and discharging stations, a mold support rotatable in a vertical plane, a plurality of molds carried thereby, means for bringing the said molds from the charging station successively to the pressing, blowing, and discharging stations, and means for maintaining the molds in a vertical position in their passage from the charging station to the pressing station and from the blowing station to the discharging station.

2. In a machine for forming articles of glassware, charging, pressing, blowing and discharging stations, a mold support rotatable in a vertical plane, a mold carried thereby, means for imparting an intermittent rotatory movement to the mold support for bringing the mold from the charging station successively to the pressing, blowing, and discharging stations, and means for maintaining the mold in a vertical position in its passage from the charging station to the pressing station and from the blowing station to the discharging station.

3. In a machine for forming articles of glassware, charging, pressing, blowing, and discharging stations, a mold support intermittently rotatable in a vertical plane, a mold carried thereby, means for bringing the said mold into operative relation with the charging, pressing, blowing, and discharging stations, means for maintaining the mold in a vertical position in its passage from the charging station to the pressing station and from the blowing station to the discharging station, means for opening the mold at the discharging station, and means for closing the mold in its passage from the discharging station to the charging station.

4. In a machine for forming articles of glassware, pressing mechanism, blowing mechanism, an intermittently rotatable mold support, a mold carried thereby, a horizontally shiftable neck plunger carried by the mold, means for shifting the said neck plunger into operative position with relation to the mold preparatory to the pressing operation, and means for shifting the said neck plunger horizontally to one side of the mold preparatory to the blowing operation.

5. In a machine for forming articles of glassware, a charging station, a pressing station, a blowing station, an intermittently rotatable mold support, a mold carried thereby, a horizontally shiftable neck plunger carried by the said mold, means for shifting the said neck plunger into operative position with relation to the mold at the charging station preparatory to the pressing operation at the pressing station, and means for swinging the neck plunger horizontally to one side of the mold at the completion of the pressing operation preparatory to the blowing operation at the blowing station.

6. In a machine for forming articles of glassware, pressing mechanism, blowing mechanism, a mold support intermittently rotatable in a vertical plane, a mold carried thereby, a horizontally shiftable neck plunger carried by the mold, means for shifting the said neck plunger into operative position with relation to the mold preparatory to the pressing operation, and means for shifting the said neck plunger horizontally to one side of the mold preparatory to the blowing operation.

7. In a machine for forming articles of glassware, a charging station, a pressing station, a blowing station, a mold support rotatable in a vertical plane, a mold carried thereby, a horizontally shiftable neck plunger carried by the said mold, means for shifting the said neck plunger into operative position with relation to the mold at the charging station preparatory to the pressing operation at the pressing station, and means for swinging the neck plunger horizontally to one side of the mold at the completion of the pressing operation preparatory to the blowing operation.

8. In a machine for forming articles of glassware, charging, pressing, blowing, and discharging stations, an intermittently rotatable mold support, a mold carried thereby, means for bringing the said mold from the charging station successively to the pressing, blowing, and discharging stations, a horizontally shiftable neck plunger carried by the said mold, means for shifting the said neck plunger into operative position with relation to the mold at the charging station preparatory to the pressing operation at the pressing station, and means for maintaining the said neck plunger in operative position with relation to the mold as the said mold is caused to be shifted from the charging station to the pressing station.

9. In a machine for forming articles of glassware by the combined operation of pressing and blowing, an intermittently rotatable mold support rotatable in a vertical plane, a mold carried thereby, a horizontally shiftable bottom carried by the said mold, and means for shifting the said bottom into operative position with relation to the mold preparatory to the blowing operation.

10. In a machine for forming articles of glassware, pressing mechanism, blowing mechanism, an intermittently rotatable mold support, a mold carried thereby, a horizontally shiftable neck plunger carried by the said mold, a horizontally shiftable bottom carried by the said mold, and operatively connected to the said neck plunger, means for shifting the said neck plunger into and the mold bottom out of operative position with relation to the mold preparatory to the pressing operation, and means for shifting the neck plunger out of and the mold bottom into operative position with relation to the mold at the completion of the pressing operation preparatory to the blowing operation.

11. In a machine for forming articles of glassware, charging, pressing, blowing, and discharging stations, a mold support capable of being intermittently rotated in a vertical plane, a series of molds carried thereby, means for bringing the said molds from the charging station successively to the pressing, blowing, and discharging stations, means for opening the molds as they reach the discharging station, and means for freeing the article from the cavity of the mold as the mold is opened at the discharging station.

12. In a machine for forming articles of glassware, charging, pressing, blowing and discharging stations, an intermittently rotatable mold support, a mold carried thereby, a horizontally shiftable bottom carried by the said mold, means for bringing the said mold from the charging station to the pressing, blowing and discharging stations, means for opening the mold at the discharging station, and means for laterally shifting the bottom of the mold as the said mold is caused to be opened at the discharging station.

In testimony whereof, we have hereunto set our hands.

HARVEY A. RICHARDS.
THOMAS J. CONWAY.

Witnesses as to Harvey A. Richards:
  GARRETT O. DRISCOLL,
  JOHN J. BURKHOLDER.
Witnesses as to Thomas J. Conway:
  M. A. BARTH,
  M. ARTHUR KELLER.

---

Copies of this patent may be obtained for five cents each, by addressing the "Commissioner of Patents, Washington, D. C."